(12) United States Patent
Awoniyi-Oteri et al.

(10) Patent No.: US 11,540,313 B2
(45) Date of Patent: Dec. 27, 2022

(54) TECHNIQUES FOR USER EQUIPMENT (UE) ASSISTED UPLINK RESOURCE MODIFICATION IN A WIRELESS COMMUNICATION SYSTEM

(71) Applicant: QUALCOMM Incorporated, San Diego, CA (US)

(72) Inventors: Olufunmilola Omolade Awoniyi-Oteri, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 30 days.

(21) Appl. No.: 17/173,894

(22) Filed: Feb. 11, 2021

(65) Prior Publication Data

US 2021/0250984 A1    Aug. 12, 2021

Related U.S. Application Data

(60) Provisional application No. 62/975,576, filed on Feb. 12, 2020.

(51) Int. Cl.
*H04W 72/14* (2009.01)
*H04W 72/12* (2009.01)
(Continued)

(52) U.S. Cl.
CPC ....... *H04W 72/14* (2013.01); *H04W 28/0278* (2013.01); *H04W 72/0413* (2013.01);
(Continued)

(58) Field of Classification Search
None
See application file for complete search history.

(56) References Cited

U.S. PATENT DOCUMENTS

2010/0070816 A1* 3/2010 Park ..................... H04L 1/1835
714/748
2017/0289995 A1* 10/2017 Lin .................. H04W 72/0413
(Continued)

FOREIGN PATENT DOCUMENTS

| WO | 2017052170 A1 | 3/2017 |
| WO | 2017172165 A1 | 10/2017 |
| WO | 2018162059 A1 | 9/2018 |

OTHER PUBLICATIONS

R2-162601 ASUSTek "Discussion on skipping UL grants" 3GPP RAN2 #93bis Dubrovnik Apr. 11-15, 2016 (Year: 2016).*
(Continued)

*Primary Examiner* — Basil Ma
(74) *Attorney, Agent, or Firm* — Arent Fox, LLP

(57) ABSTRACT

The present application relates to user equipment (UE) assisted uplink resource modification. In one implementation, a UE may determine an upcoming absence of uplink data for transmission on an uplink communication channel to a network entity during a period defined by a configured grant, and transmit a message to the network entity to trigger adjustment of at least one resource associated with the configured grant. In another implementation, a network entity may receive a message from a UE representing an upcoming absence of uplink data on an uplink communication channel during a scheduled period defined by a configured grant, and adjust at least one resource associated with the configured grant in response to receiving the message

27 Claims, 11 Drawing Sheets

(51) Int. Cl.
H04W 72/04 (2009.01)
H04W 28/02 (2009.01)
H04W 80/02 (2009.01)

(52) U.S. Cl.
CPC ... *H04W 72/0466* (2013.01); *H04W 72/1268* (2013.01); *H04W 80/02* (2013.01)

(56) References Cited

U.S. PATENT DOCUMENTS

2020/0244406 A1\* 7/2020 Lee .................. H04L 1/1835
2021/0160791 A1\* 5/2021 Sha .................. H04W 52/365

OTHER PUBLICATIONS

R2-153332 Samsung "Skipping uplink transmission with no data to transmit" 3GPP WG2 #91 Beijing Aug. 24-28, 2015 (Year: 2015).\*
R2-162264 Huawei "On UL grants skipping" 3GPP WG2 #93b Apr. 11-15, 2016 (Year: 2016).\*
International Search Report and Written Opinion—PCT/US2021/017977—ISA/EPO—dated Jun. 1, 2021.

\* cited by examiner

TECHNIQUES FOR USER EQUIPMENT (UE) ASSISTED UPLINK RESOURCE MODIFICATION IN A WIRELESS COMMUNICATION SYSTEM

CROSS-REFERENCE TO RELATED APPLICATION(S)

This application claims the benefit of U.S. Provisional Patent Application No. 62/975,576, entitled "TECHNIQUES FOR UE-ASSISTED UPLINK RESOURCE MODIFICATION IN A WIRELESS COMMUNICATION SYSTEM" and filed on Feb. 12, 2020, which is expressly incorporated by reference herein in its entirety.

BACKGROUND

Aspects of the present disclosure relate generally to wireless communication systems, and more particularly, to user equipment (UE)-assisted uplink resource modification.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as NR) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

For example, for various communications technology such as, but not limited to NR, some implementations may increase transmission speed and flexibility but also transmission complexity. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of wireless communication at a user equipment (UE), including determining an upcoming absence of uplink data for transmission on an uplink communication channel to a network entity during a period defined by a configured grant, and transmitting a message to the network entity to trigger adjustment of at least one resource associated with the configured grant based on determining the absence of uplink data for transmission on the uplink communication channel.

A further example implementation includes an apparatus for wireless communications comprising a memory and at least one processor in communication with the memory. The at least one processor may be configured to determine an upcoming absence of uplink data for transmission on an uplink communication channel to a network entity during a period defined by a configured grant. The at least one processor may be configured to transmit a message to the network entity to trigger adjustment of at least one resource associated with the configured grant based on determining the absence of uplink data for transmission on the uplink communication channel.

An additional example implementation includes an apparatus for wireless communications. The apparatus may include means for determining an upcoming absence of uplink data for transmission on an uplink communication channel to a network entity during a period defined by a configured grant, and means for transmitting a message to the network entity to trigger adjustment of at least one resource associated with the configured grant based on determining the absence of uplink data for transmission on the uplink communication channel.

A further example implementation includes computer-readable medium storing computer code executable by a processor for wireless communications comprising code for determining an upcoming absence of uplink data for transmission on an uplink communication channel to a network entity during a period defined by a configured grant, and transmitting a message to the network entity to trigger adjustment of at least one resource associated with the configured grant based on determining the absence of uplink data for transmission on the uplink communication channel.

Another example implementation includes a method of wireless communication at a network entity, including receiving a message from a UE representing an upcoming absence of uplink data on an uplink communication channel during a scheduled period defined by a configured grant, and adjusting at least one resource associated with the configured grant in response to receiving the message.

A further example implementation includes an apparatus for wireless communications comprising a memory and at least one processor in communication with the memory. The at least one processor may be configured to receive a message from a UE representing an upcoming absence of uplink data on an uplink communication channel during a scheduled period defined by a configured grant. The at least one processor may be configured to adjust at least one resource associated with the configured grant in response to receiving the message.

An additional example implementation includes an apparatus for wireless communications. The apparatus may include means for receiving a message from a UE representing an upcoming absence of uplink data on an uplink communication channel during a scheduled period defined by a configured grant, and means for adjusting at least one resource associated with the configured grant in response to receiving the message.

A further example implementation includes computer-readable medium storing computer code executable by a processor for wireless communications comprising code for receiving a message from a UE representing an upcoming absence of uplink data on an uplink communication channel during a scheduled period defined by a configured grant, and adjusting at least one resource associated with the configured grant in response to receiving the message.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
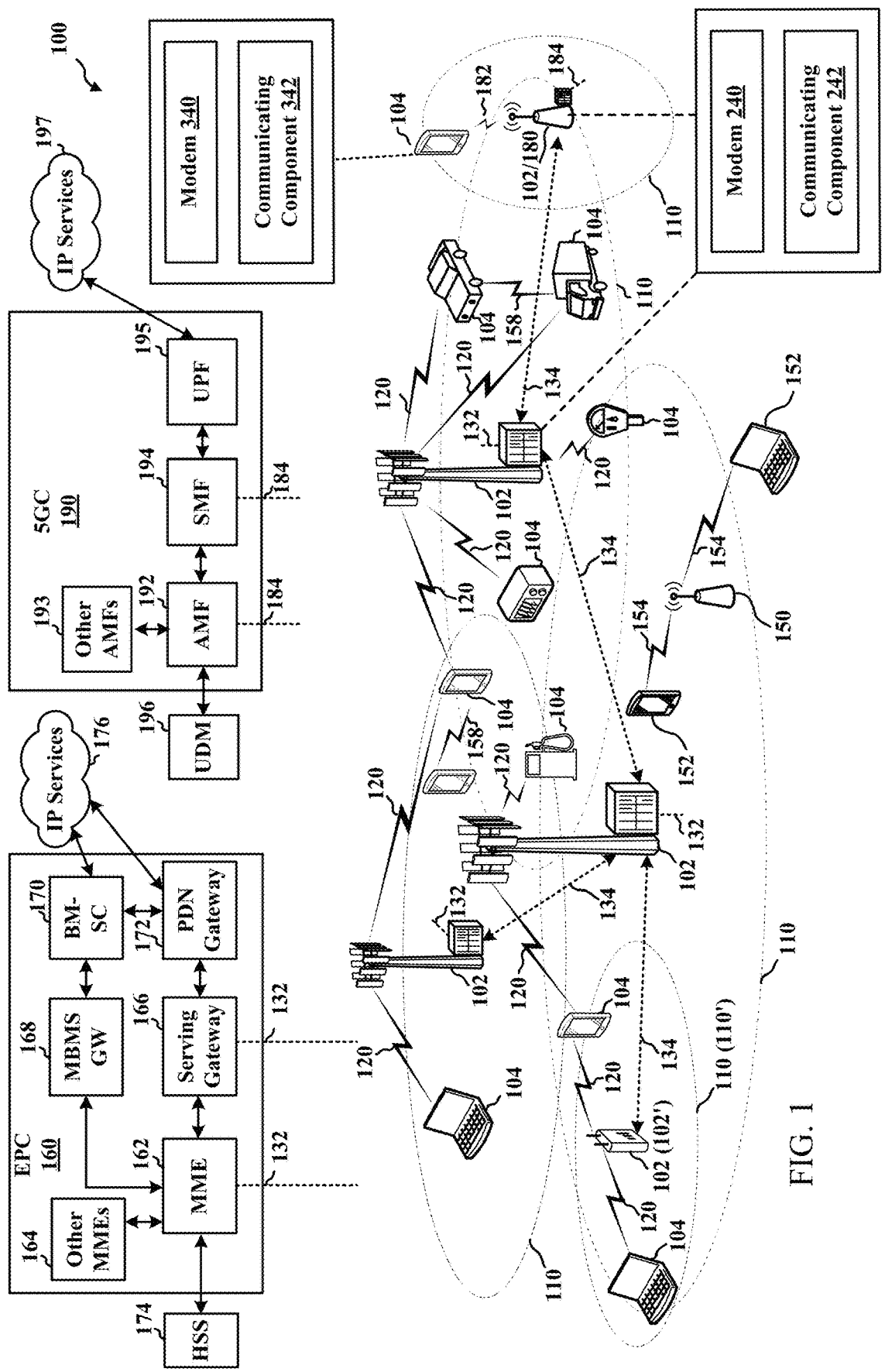
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to UE-assisted uplink resource modification. Specifically, in New Radio (NR) uplink, for periodic data being transmitted on the uplink, the network can set-up non-dynamic (semi-persistent) grants for such transmission. The use of non-dynamic grants may be to reduce the control over head. In some aspects, there may be two non-dynamic grants. A first type may be a configured grant type 1, which provides parameters, configuration information, and activation via radio resource control (RRC) signaling. A second type may be a configured grant type 2, which include periodicity configuration via RRC signaling and activation using a physical downlink control channel (PDCCH) for activation, as well as parameter configuration and medium access control (MAC) control element (CE) for acknowledgement of the activation signal. In some implementations, if the UE is configured with a non-dynamic grant and the UE does not have data to transmit, the UE forgoes transmitting the data. However, the UE may benefit from notifying the network when there is an absence of data for uplink transmission associated with the grant for more efficient utilization of the resources and potential energy reduction at the network.

In an aspect, the present disclose includes a method, apparatus, and non-statutory computer readable medium for wireless communications for determining an upcoming absence of uplink data for transmission on an uplink communication channel to a network entity during a period defined by a configured grant, and transmitting a message to the network entity to trigger adjustment of at least one resource associated with the configured grant based on determining the absence of uplink data for transmission on the uplink communication channel.

In another implementation, the present disclose includes a method, apparatus, and non-statutory computer readable medium for wireless communications for receiving a message from a UE representing an upcoming absence of uplink data on an uplink communication channel during a scheduled period defined by a configured grant, and adjusting at least one resource associated with the configured grant in response to receiving the message The described features will be presented in more detail below with reference to FIGS. 1-7.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) NR networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102, which may also be referred to as network entities, may include macro cells (high power cellular base station) and/or small cells (low power cellular base station). The macro cells can include base stations. The small cells can include femtocells, picocells, and microcells. In an example, the base stations 102 may also include gNBs 180, as described further herein.

In one example, some nodes such as base station 102/gNB 180, may have a modem 240 and communicating component 242 for UE-assisted uplink resource modification, as described herein. Though a base station 102/gNB 180 is shown as having the modem 240 and communicating component 242, this is one illustrative example, and substantially any node may include a modem 240 and communicating component 242 for providing corresponding functionalities described herein.

In another example, some nodes such as UE 104 of the wireless communication system may have a modem 340 and communicating component 342 for UE-assisted uplink resource modification, as described herein. Though a UE 104 is shown as having the modem 340 and communicating component 342, this is one illustrative example, and substantially any node or type of node may include a modem 340 and communicating component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 132, 134 and/or 184 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHz -7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 4A:
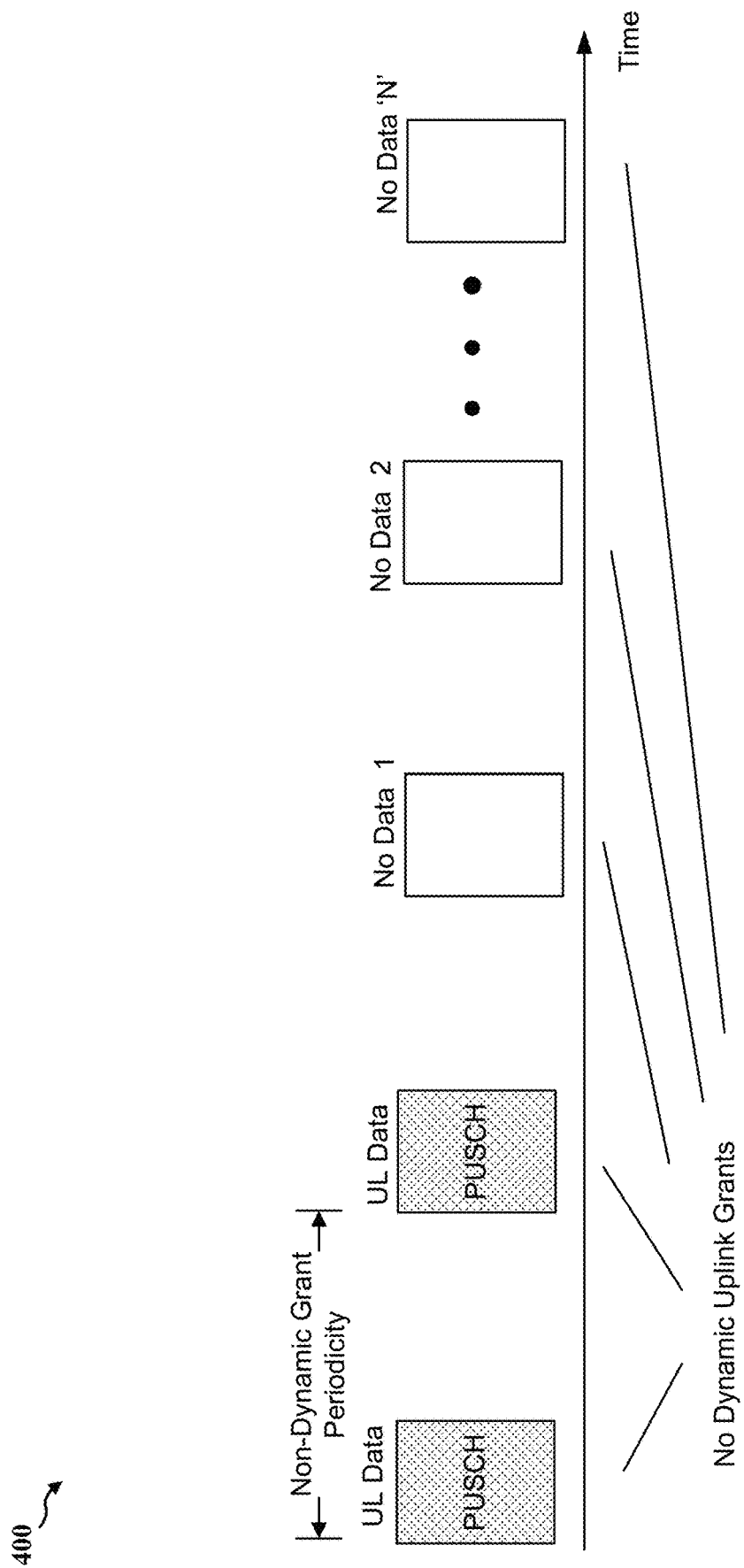
FIG. 4A is an example data communication session over time on the uplink, in accordance with various aspects of the present disclosure.
Figure 4B:
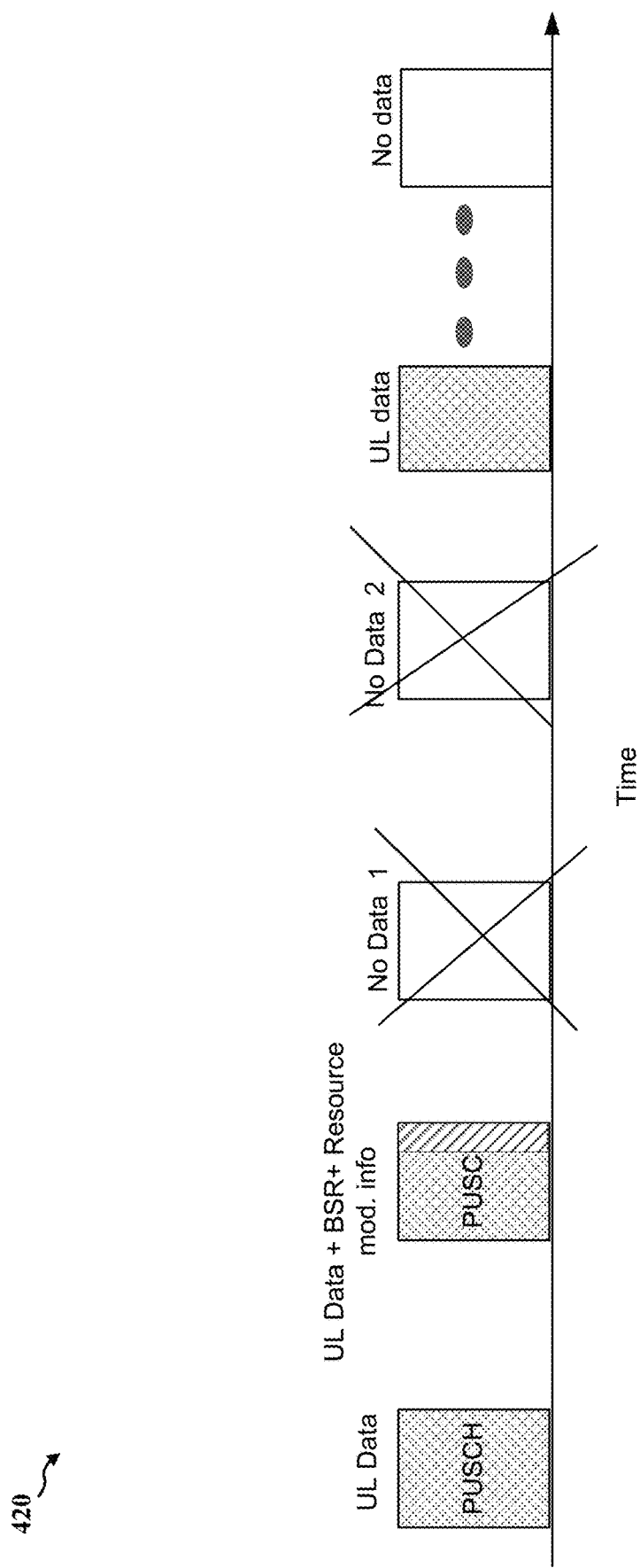
FIG. 4B is an example media access control (MAC) signaling session over time on the uplink, in accordance with various aspects of the present disclosure.
Figure 4C:
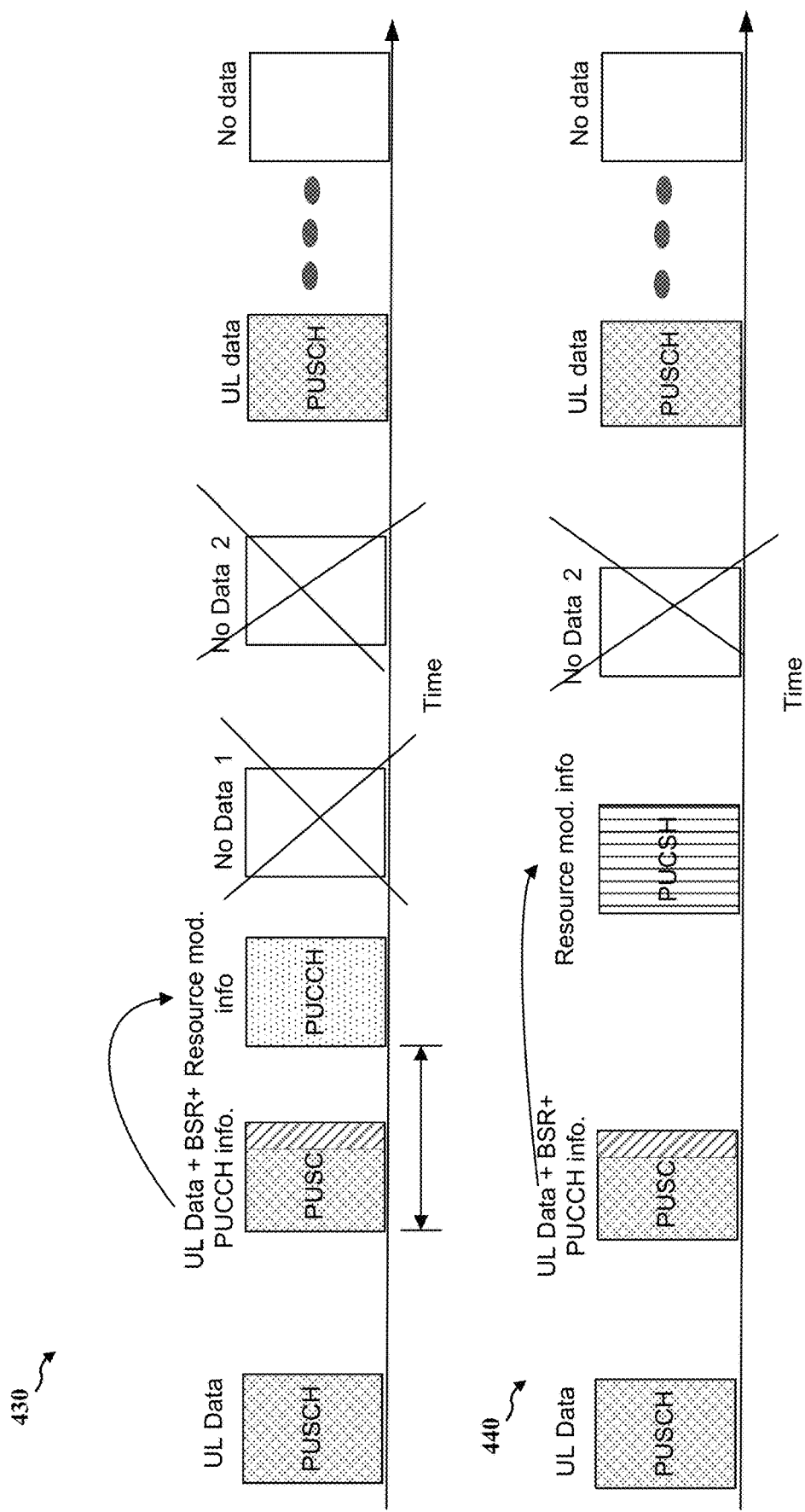
FIG. 4C is an example MAC indication and Layer 1 signaling over time on the uplink, in accordance with various aspects of the present disclosure.
Figure 4D:
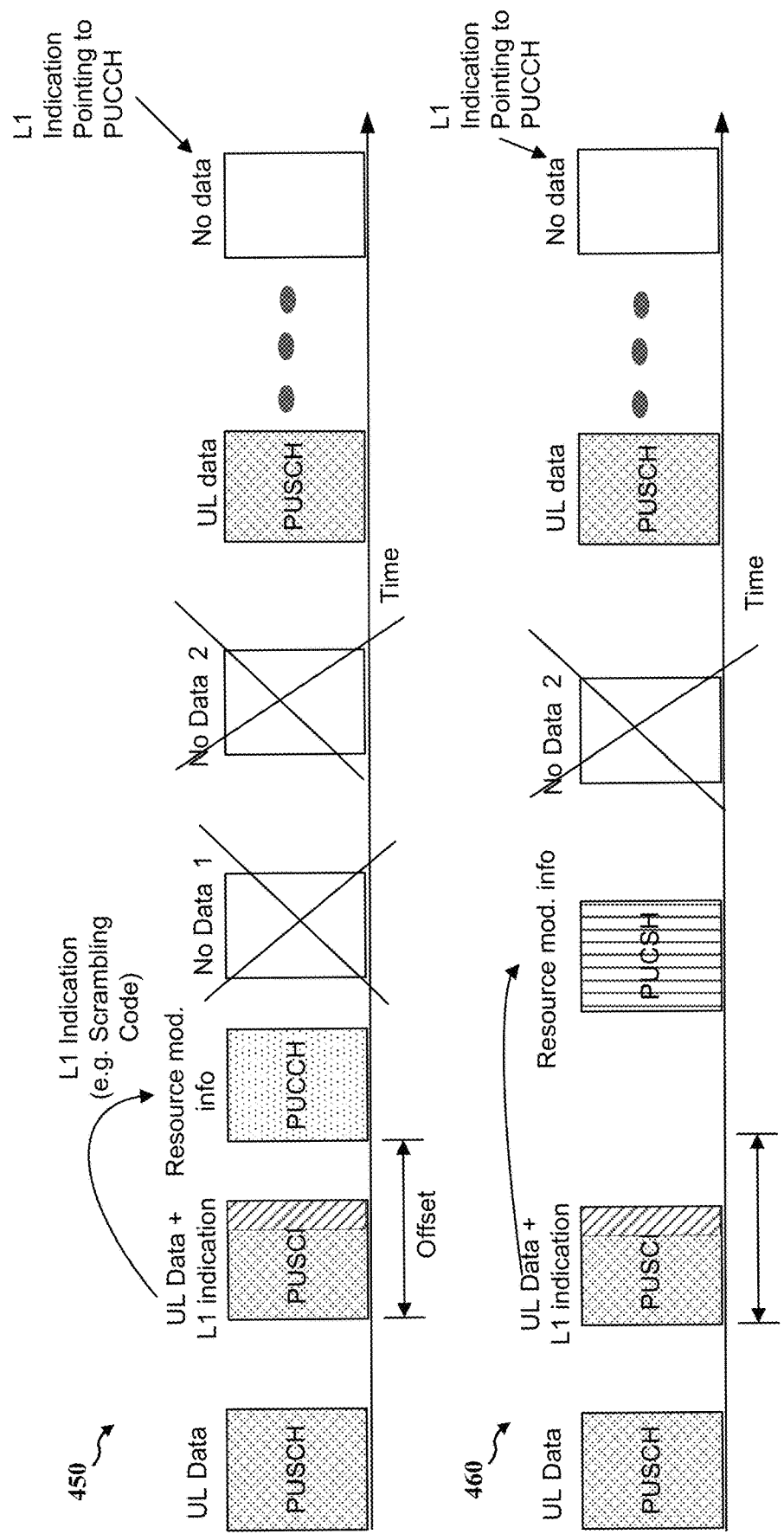
FIG. 4D is an example Layer 1 indication and Layer 1 signaling over time on the uplink, in accordance with various aspects of the present disclosure.
Figure 4E:
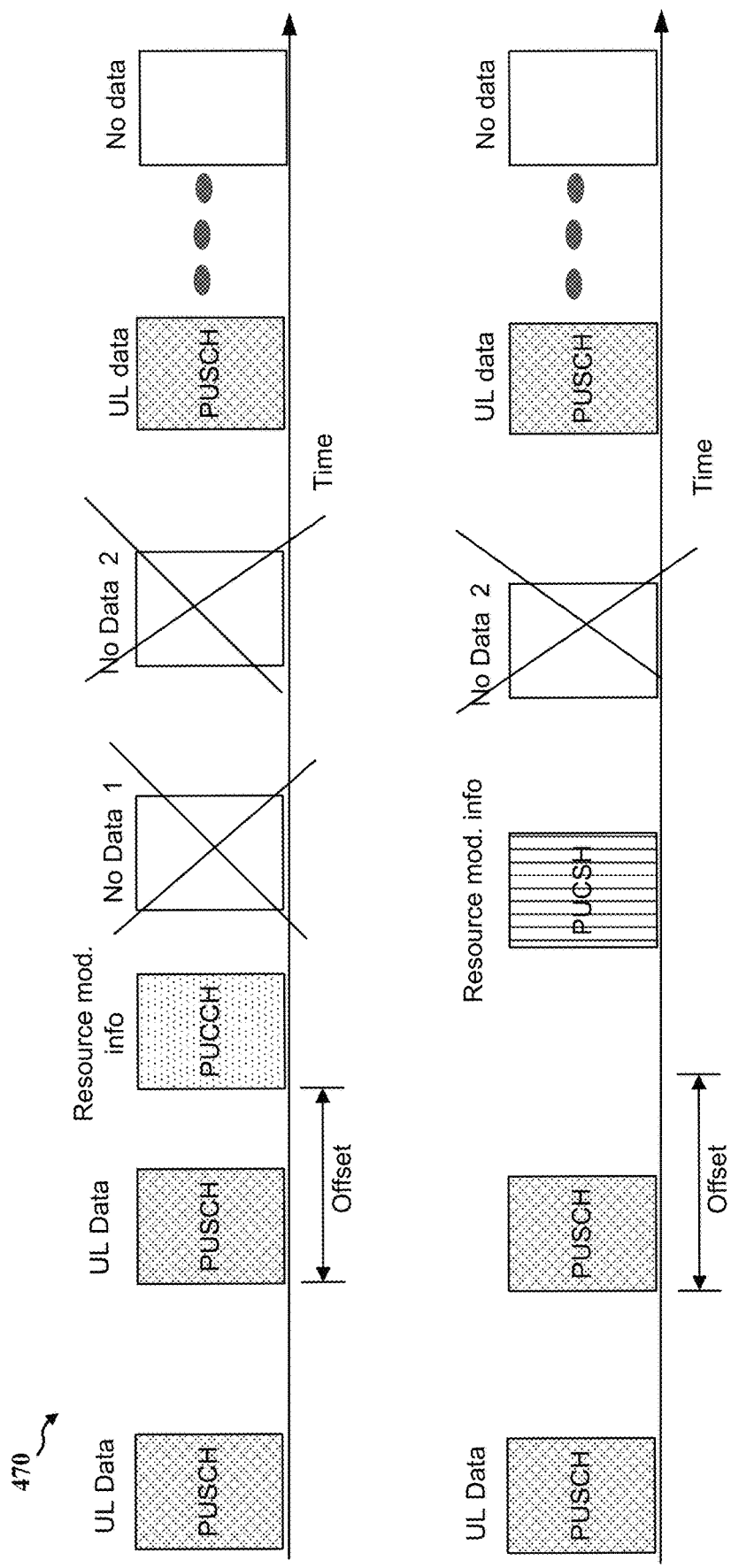
FIG. 4E is an example Layer 1 signaling over time on the uplink, in accordance with various aspects of the present disclosure.
Figure 5:
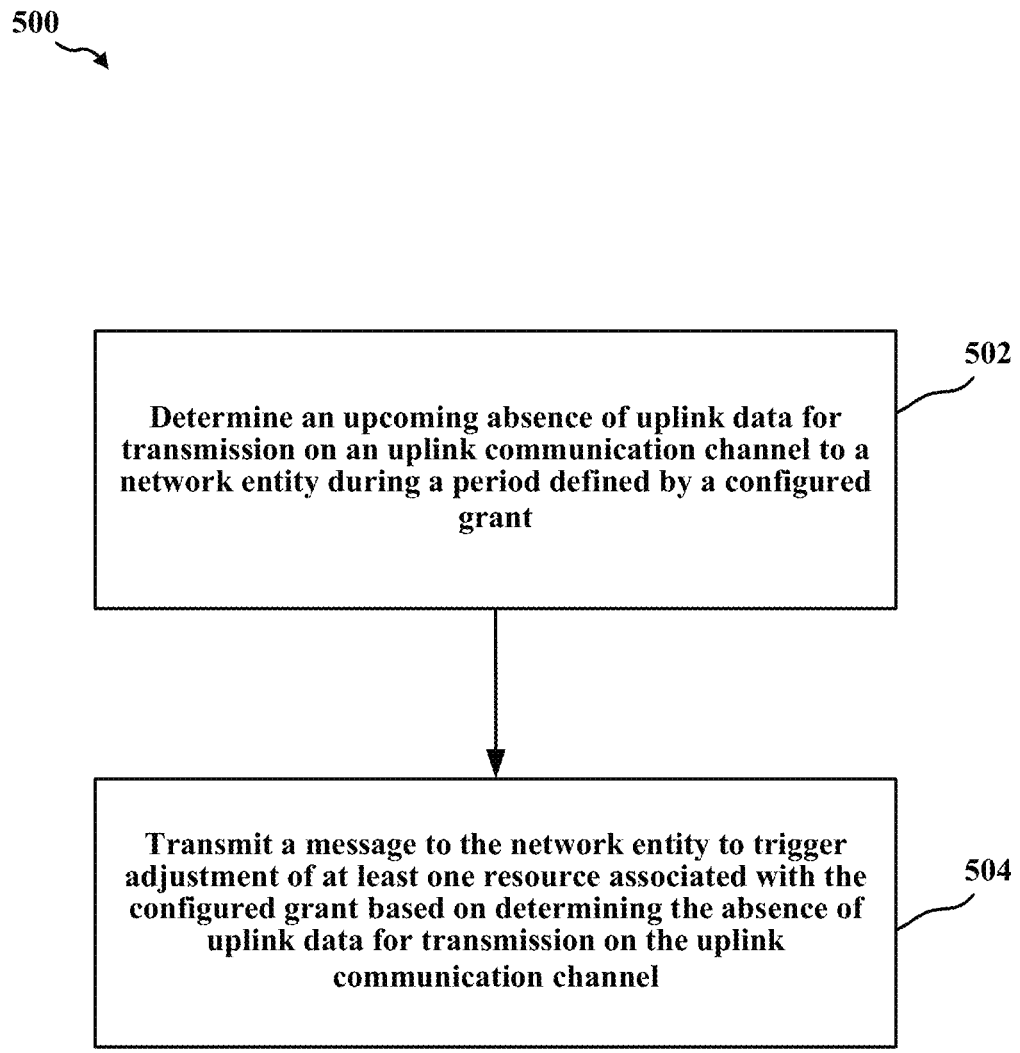
FIG. 5 is a flowchart of a method of wireless communication at a UE, in accordance with various aspects of the present disclosure.
Figure 6:
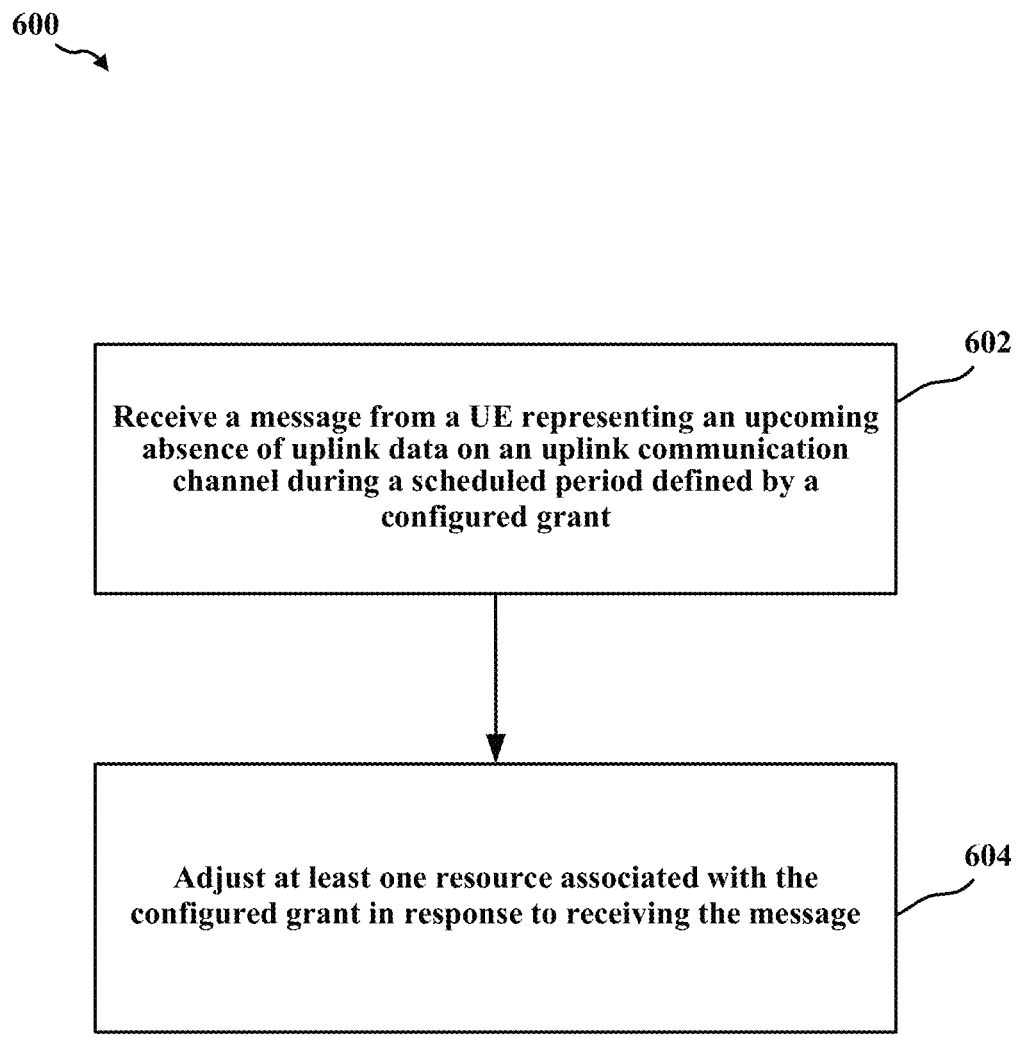
FIG. 6 is a flowchart of another method of wireless communication at a network entity, in accordance with various aspects of the present disclosure.

Turning now to FIGS. 2-7, aspects are depicted with reference to one or more components and one or more methods that may perform the actions or operations described herein, where aspects in dashed line may be optional. Although the operations described below in FIGS. 5 and 6 is presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Figure 2:
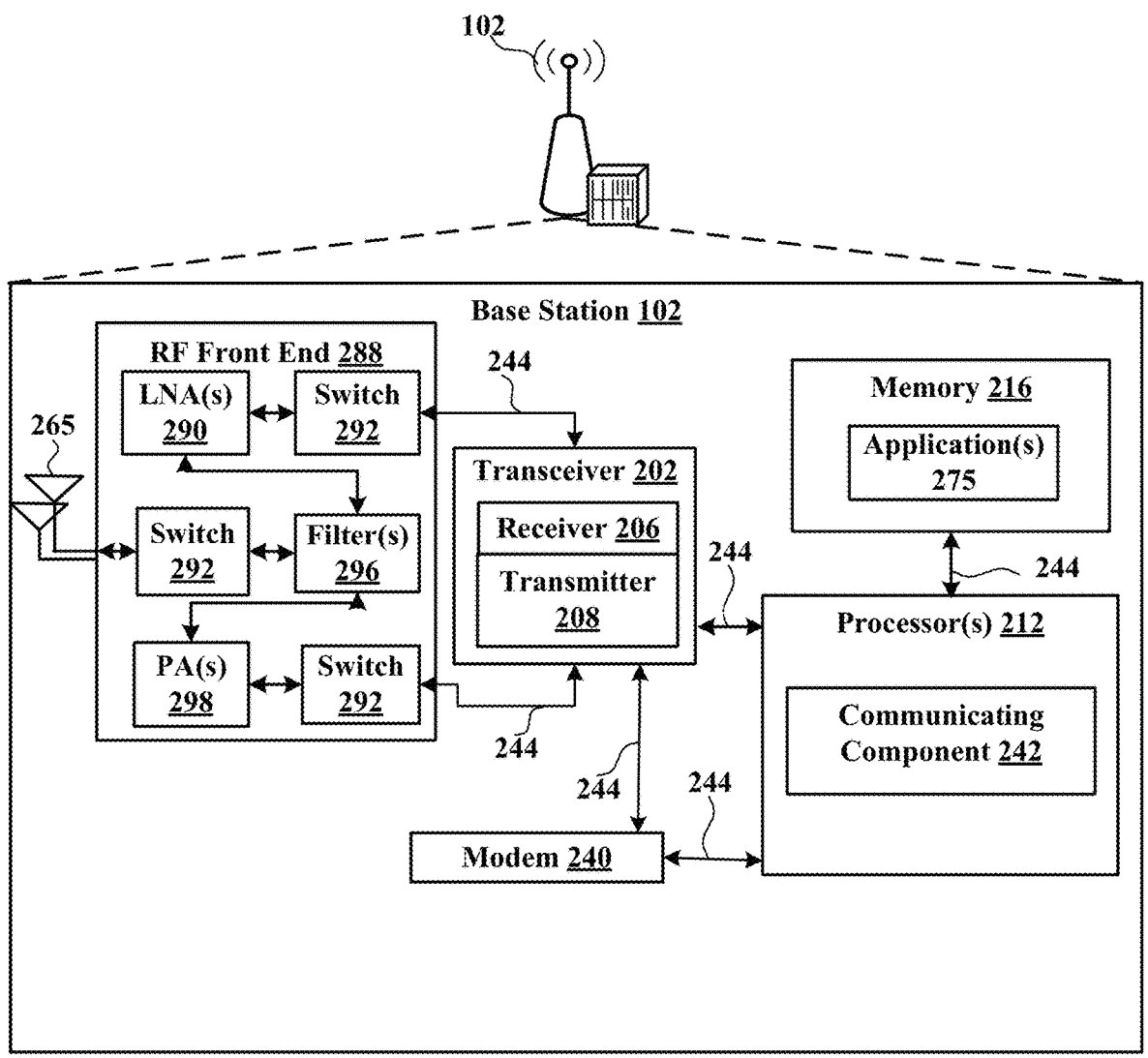
FIG. 2 is a block diagram illustrating an example of a network entity (also referred to as a base station), in accordance with various aspects of the present disclosure.

Referring to FIG. 2, one example of an implementation of a node such as base station 102 (e.g., a base station 102 and/or gNB 180, as described above) may include a variety of components, some of which have already been described above and are described further herein, including components such as one or more processors 212 and memory 216 and transceiver 202 in communication via one or more buses 244, which may operate in conjunction with modem 240 and/or communicating component 242 for UE-assisted uplink resource modifications.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when base station 102 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, base station 102 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals. The antennas 265 may include one or more antennas, antenna elements, and/or antenna arrays.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, the processor(s) 212 may correspond to one or more of the processors described in connection with the UE in FIGS. 4 and 6. Similarly, the memory 216 may correspond to the memory described in connection with the UE in FIG. 7.

Figure 3:
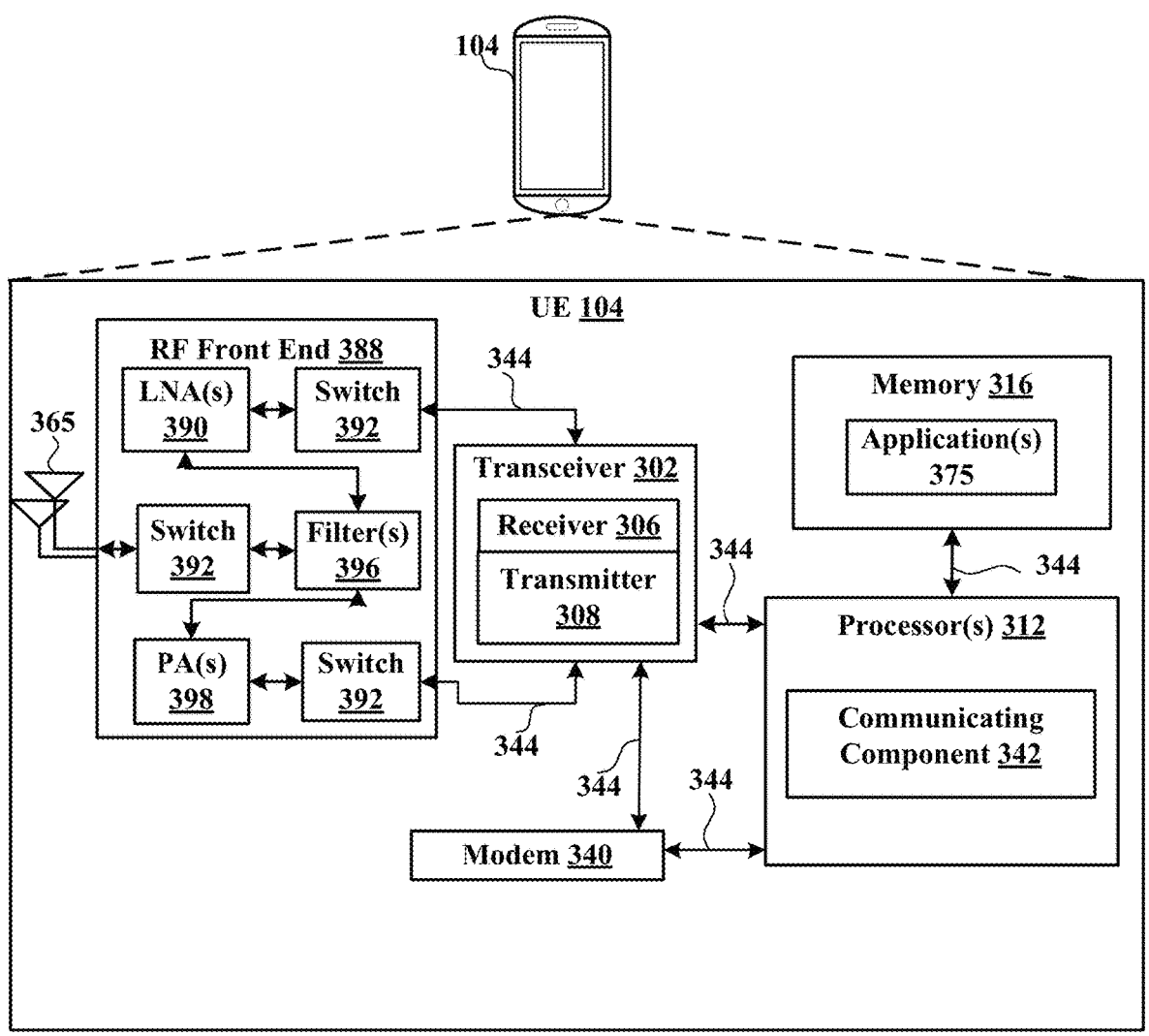
FIG. 3 is a block diagram illustrating an example of a user equipment (UE), in accordance with various aspects of the present disclosure.

Referring to FIG. 3, one example of an implementation of UE 104 may include a variety of components, some of which have already been described above and are described further herein, including components such as one or more processors 312 and memory 316 and transceiver 302 in communication via one or more buses 344, which may operate in conjunction with modem 340.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of base station 102, as described above, but configured or otherwise programmed for base station operations as opposed to base station operations.

In an aspect, the processor(s) 312 may correspond to one or more of the processors described in connection with the base station in FIG. 7. Similarly, the memory 316 may correspond to the memory described in connection with the base station in FIG. 7.

FIG. 4A is an example data communication session 400 over time on the uplink. For example, from the perspective of a gNB, a lack of data reception may either be due to undetected data or the UE may have no data to transmit on the uplink. Therefore, the gNB may wait for a number of absent data receptions, 'N', before concluding the UE does not have any data to transmit on the uplink. However, a more efficient and dynamic manner in terms of resource usage may be such that the UE explicitly notifies the gNB that the resources may no longer be utilized and hence, can be released or suspended for a duration of time. Accordingly, releasing, suspending, or skipping of resources at the gNB may also create opportunities for network energy savings at the gNB.

FIG. 4B is an example media access control (MAC) signaling session 420 over time on the uplink. In such implementation, one of the triggers for a buffer status report (BSR) transmission may be when there is space left unfilled by a payload to be transmitted. As such, rather than include padding, the UE can include a regular BSR in the payload corresponding to a last uplink data that is to be transmitted to the network entity (e.g., gNB). In some aspects, the BSR MAC CE carries the logical channel group identifier (LCG ID) and the buffer size. In addition to the BSR, the UE can include information related to the modification of the non-dynamic resources, e.g., suspension/release of the non-dynamic grant. Such resource modification information may indicate, for example, a release or suspension of resources, a suspension length, or a skipping of resources.

FIG. 4C is an example MAC indication 430 and Layer 1 signaling 440 over time on the uplink. Specifically, if the information to be conveyed to the gNB is larger than the space available in the payload/BSR, then the payload/BSR can carry a flag informing the gNB to expect an upcoming transmission of non-dynamic grant modification information in the next PUCCH or PUSCH transmission. In one aspect, the resource modification information may be transmitted in the PUCCH occurring before the scheduled PUSCH. The PUCCH information may include the flag and may be offset from the current PUSCH. In another aspect, the resource modification information may be transmitted to the gNB using a next scheduled PUSCH.

FIG. 4D is an example Layer 1 indication 450 and Layer 1 signaling 460 over time on the uplink. Specifically, in some cases, there may be no space left in the last non-dynamic grant carrier data to carry resource modification information on the uplink. In certain cases, a faster modification timeline may be desired than can be provided by Layer 2 signaling. In this case, the Layer 1 signaling can be used in conveying the modification information. In one implementation, an Layer 1 indication may point to a PUCCH transmission. In another implementation, a Layer 1 indication may point to PUSCH. The PUSCH carrying the last data may use a Layer 1 indication to notify the network that the next PUCCH or PUSCH transmission may carry the resource modification information and when to expect the PUCCH or PUSCH transmission, or release or suspension may be requested to be carried out according to some predetermined rule if previously defined.

FIG. 4E is an example Layer 1 signaling 470 over time on the uplink. In some aspects, the UE may already have an upcoming PUCCH occasion. In such scenario, the present implementations may use the scheduled PUCCH occasion to also transmit the resource modification on the PUCCH. In some aspects, existing PUCCH formats may be used. Otherwise, new PUCCH formats may be defined. In some aspects, if there are no upcoming PUCCH occasions, the next PUSCH occasion may be used to carry the resource modification information either as a known sequence or scrambling code. In one aspect, the resource modification information may correspond to a resource release providing complete release of all resources. In another aspect, the resource modification information may correspond to resource dormancy providing resource suspension starting immediately for a duration, e.g., 'M' periods. In a further aspect, the resource modification information may correspond to resource skipping providing skipping resource for a number of periods.

FIG. 5 illustrate a flow chart of an example of a method 500 for wireless communication at a UE. In an example, a UE 104 can perform the functions described in method 500 using one or more of the components described in FIGS. 1, 2, 3, and 7.

At block 502, the method 500 may determine an upcoming absence of uplink data for transmission on an uplink communication channel to a network entity during a period defined by a configured grant. In an aspect, the communicating component 342, e.g., in conjunction with processor(s) 312, memory 316, and/or transceiver 302, may be configured to determine an upcoming absence of uplink data for transmission on an uplink communication channel to a network entity during a period defined by a configured grant. Thus, the UE 104, the processor(s) 312, the communicating component 342 or one of its subcomponents may define the means for determining an upcoming absence of uplink data for transmission on an uplink communication channel to a network entity during a period defined by a configured grant. For example, in an aspect, the UE 104 may determine there are unused uplink resources based on its uplink data payload and the assigned uplink resources indicated in the uplink grant.

At block 504, the method 500 may transmit a message to the network entity to trigger adjustment of at least one resource associated with the configured grant based on determining the absence of uplink data for transmission on the uplink communication channel. In an aspect, the communicating component 342, e.g., in conjunction with processor(s) 312, memory 316, and/or transceiver 302, may be configured to transmit a message to the network entity to trigger adjustment of at least one resource associated with the configured grant based on determining the absence of uplink data for transmission on the uplink communication channel. Thus, the UE 104, the processor(s) 312, the communicating component 342 or one of its subcomponents may define the means for transmitting a message to the network entity to trigger adjustment of at least one resource associated with the configured grant based on determining the absence of uplink data for transmission on the uplink communication channel. For example, in an aspect, the UE 104 can operate processor 302 to generate the message in the form of data bits, and may further operate the transceiver 302, RF front end 388, and one or more antennas 365 to transmit the data bits as a wireless signal or waveform, as described.

In some aspects, the message may be transmitted using a MAC CE.

In some aspects, the message may be transmitted using a BSR MAC CE.

In some aspects, the message may further include adjustment information of the at least one resource associated with the configured grant.

In some aspects, transmitting the message may include transmitting final uplink data and the adjustment information using a the MAC CE.

In some aspects, the MAC CE may be transmitted on a last resource of a PUSCH transmission along with final uplink data.

In some aspects, the message may further include an indication corresponding to a flag indicating an upcoming transmission of adjustment information.

In some aspects, the indication may further include information about the resource carrying the adjustment information including an offset from a resource carrying the flag.

In some aspects, the method 500 may further include determining that the final uplink data and the buffer status report satisfies a payload size threshold value representing a maximum size of a PUSCH transmission corresponding to the defined period allocated by the configured grant, and transmitting the adjustment information of the at least one resource associated with the configured grant to the network entity, the indication may be corresponds to the flag indicating the upcoming transmission of adjustment information is transmitted based on determining that final uplink data and the buffer status report satisfies a payload size threshold value. In an aspect, the communicating component 342, e.g., in conjunction with processor(s) 312, memory 316, and/or transceiver 302, may be configured to determine that the final uplink data and the buffer status report satisfies a payload size threshold value representing a maximum size of a PUSCH transmission corresponding to the defined period allocated by the configured grant, and transmit the adjustment information of the at least one resource associated with the configured grant to the network entity, the indication may be corresponds to the flag indicating the upcoming transmission of adjustment information is transmitted based on determining that final uplink data and the buffer status report satisfies a payload size threshold value. Thus, the UE 104, the processor(s) 312, the communicating component 342 or one of its subcomponents may define the means for determining that the final uplink data and the buffer status report satisfies a payload size threshold value representing a maximum size of a PUSCH transmission corresponding to the defined period allocated by the configured grant, and transmitting the adjustment information of the at least one resource associated with the configured grant to the network entity, the indication may be corresponds to the flag indicating the upcoming transmission of adjustment information is transmitted based on determining that final uplink data and the buffer status report satisfies a payload size threshold value. For example, in an aspect, the UE 104 may compare a size of the uplink data and the buffer status report to the payload size threshold and identify if the comparison meets the threshold so as to trigger generation data bits that represent the adjustment information, and may further operate the transceiver 302, RF front end 388, and one or more antennas 365 to transmit the data bits as a wireless signal or waveform, as described.

In some aspects, the adjustment information may be transmitted on a PUCCH prior to the next scheduled PUSCH transmission associated with the configured grant.

In some aspects, the adjustment information may be transmitted on a subsequent scheduled PUSCH transmission associated with the configured grant after a Layer 1 indication is transmitted on a current PUSCH, the Layer 1 indication corresponding to an indication represented by a number of bits or a scrambling code used to scramble the current PUSCH.

In some aspects, the message in the PUSCH may correspond to a Layer 1 indication pointing to the adjustment information transmission on a PUCCH or PUSCH.

In some aspects, transmitting the message may include transmitting final uplink data and the Layer 1 indication using a PUSCH transmission of the configured grant, the Layer 1 indication corresponding to a payload including a number of bits or a scrambling code used to scramble the said PUSCH.

In some aspects, the method 500 may further include transmitting, via a subsequent PUSCH, the adjustment information of the at least one resource associated with the configured grant. In an aspect, the communicating component 342, e.g., in conjunction with processor(s) 312, memory 316, and/or transceiver 302, may be configured to transmit, via a subsequent PUSCH, the adjustment information of the at least one resource associated with the configured grant. Thus, the UE 104, the processor(s) 312, the communicating component 342 or one of its subcomponents may define the means for transmitting, via a subsequent PUSCH, the adjustment information of the at least one resource associated with the configured grant. For example, in an aspect, the UE 104 can operate processor 302 to generate the adjustment information in the form of data bits, and may further operate the transceiver 302, RF front end 388, and one or more antennas 365 to transmit the data bits as a wireless signal or waveform, as described.

In some aspects, the method 500 may further include transmitting, via PUCCH, the adjustment information of the at least one resource associated with the configured grant. In an aspect, the communicating component 342, e.g., in conjunction with processor(s) 312, memory 316, and/or transceiver 302, may be configured to transmit, via PUCCH, the adjustment information of the at least one resource associated with the configured grant. Thus, the UE 104, the processor(s) 312, the communicating component 342 or one of its subcomponents may define the means for transmitting, via PUCCH, the adjustment information of the at least one resource associated with the configured grant. For example, in an aspect, the UE 104 can operate processor 302 to generate the adjustment information in the form of data bits, and may further operate the transceiver 302, RF front end 388, and one or more antennas 365 to transmit the data bits as a wireless signal or waveform, as described.

In some aspects, transmitting, via a PUCCH, the message may include transmitting adjustment information of the at least one resource associated with the configured grant, the adjustment information corresponding to a payload including a number of bits or scrambling code used for scrambling the PUCCH.

In some aspects, transmitting, via a PUSCH, the message may include transmitting adjustment information of the at least one resource associated with the configured grant, the adjustment information corresponding to a payload including a number of bits or scrambling code used for scrambling the PUSCH.

In some aspects, the adjustment of the at least one resource may correspond to at least one of a release of the at least one resource, a suspension of the at least one resource for a duration, or a skipping of the at least one resource for a certain duration.

FIG. 6 illustrate a flow chart of an example of a method 600 for wireless communication at a network entity such as base station 102. In an example, a base station 102 can perform the functions described in method 600 using one or more of the components described in FIGS. 1, 2, 3, and 7.

At block 602, the method 600 may receive a message from a UE representing an upcoming absence of uplink data on an uplink communication channel during a scheduled period defined by a configured grant. In an aspect, the communicating component 242, e.g., in conjunction with processor(s) 212, memory 216, and/or transceiver 202, may be configured to receive a message from a UE representing an upcoming absence of uplink data on an uplink communication channel during a scheduled period defined by a configured grant. In one example, the data can be associated with a priority level. Thus, the base station 102, the processor(s) 212, the communicating component 242 or one of its subcomponents may define the means for receiving a message from a UE representing an upcoming absence of uplink data on an uplink communication channel during a scheduled period defined by a configured grant. For example, in an aspect, the base station 102 may further operate the transceiver 202, RF front end 288, and one or more antennas 265 to receiving the message in the form of data bits as a wireless signal or waveform, as described.

At block 604, the method 600 may adjust at least one resource associated with the configured grant in response to receiving the message. In an aspect, the communicating component 242, e.g., in conjunction with processor(s) 212, memory 216, and/or transceiver 202, may be configured to adjust at least one resource associated with the configured grant in response to receiving the message. Thus, the base station 102, the processor(s) 212, the communicating component 242 or one of its subcomponents may define the means for adjusting at least one resource associated with the configured grant in response to receiving the message. For example, in an aspect, the base station 102 may operate processor 202 to process the message and the adjustment the resource.

In some aspects, the method 600 may further include transmitting an adjustment message indicating adjustment of the at least one resource associated with the configured grant to the UE. In an aspect, the communicating component 242, e.g., in conjunction with processor(s) 212, memory 216, and/or transceiver 202, may be configured to transmit an adjustment message indicating adjustment of the at least one resource associated with the configured grant to the UE. In one example, the data can be associated with a priority level. Thus, the base station 102, the processor(s) 212, the communicating component 242 or one of its subcomponents may define the means for transmitting an adjustment message indicating adjustment of the at least one resource associated with the configured grant to the UE. For example, in an aspect, the base station 102 may further operate the transceiver 202, RF front end 288, and one or more antennas 265 to transmit the adjustment message in the form of data bits as a wireless signal or waveform, as described.

In some aspects, the method 600 may further include withdrawing the configured grant in response to adjusting the at least one resource, and forgoing transmission of an adjustment message indicating adjustment of the at least one resource to the UE. In an aspect, the communicating component 242, e.g., in conjunction with processor(s) 212, memory 216, and/or transceiver 202, may be configured to withdraw the configured grant in response to adjusting the at least one resource, and forgoing transmission of an adjustment message indicating adjustment of the at least one resource to the UE. In one example, the data can be associated with a priority level. Thus, the base station 102, the processor(s) 212, the communicating component 242 or one of its subcomponents may define the means for withdrawing the configured grant in response to adjusting the at least one resource, and forgoing transmission of an adjustment message indicating adjustment of the at least one resource to the UE. For example, in an aspect, the base station 102 may operate processor 202 to remove the grant and not activate the communication components to transmit the adjustment the resource.

In some aspects, the message may be transmitted using a MAC CE.

In some aspects, the message may be transmitted using a BSR MAC CE.

In some aspects, the message may further include adjustment information of the at least one resource associated with the configured grant.

In some aspects, receiving the message may include receiving final uplink data and the adjustment information using a MAC CE.

In some aspects, the MAC CE is transmitted on a last resource of a PUSCH transmission along with final uplink data.

In some aspects, the message may further include an indication corresponding to a flag indicating an upcoming transmission of adjustment information.

In some aspects, the indication may further include information about a resource carrying the adjustment information including an offset from a resource carrying the flag.

In some aspects, the adjustment information may be transmitted on a PUCCH prior to the next scheduled PUSCH transmission associated with the configured grant.

In some aspects, the adjustment information may be transmitted on a subsequent scheduled PUSCH transmission associated with the configured grant after the Layer 1 indication is transmitted on a current PUSCH carrying the message.

In some aspects, the message in a PUSCH may corresponds to a Layer 1 indication pointing to the adjustment information transmission on a PUCCH or another PUSCH.

In some aspects, receiving the message may include receiving final uplink data and the Layer 1 indication using a PUSCH transmission of the configured grant, the Layer 1 indication corresponding to a payload including a number of bits or a scrambling code used to scramble the PUSCH.

In some aspects, the method 600 may further include receiving, via a subsequent PUSCH, the adjustment information of the at least one resource associated with the configured grant. In an aspect, the communicating component 242, e.g., in conjunction with processor(s) 212, memory 216, and/or transceiver 202, may be configured to receive, via a subsequent PUSCH, the adjustment information of the at least one resource associated with the configured grant. In one example, the data can be associated with a priority level. Thus, the base station 102, the processor(s) 212, the communicating component 242 or one of its subcomponents may define the means for receiving, via a subsequent PUSCH, the adjustment information of the at least one resource associated with the configured grant. For example, in an aspect, the base station 102 may further operate the transceiver 202, RF front end 288, and one or more antennas 265 to receive the adjustment information in the form of data bits as a wireless signal or waveform, as described.

In some aspects, the method 600 may further include receiving, via PUCCH, the message and the adjustment information of the at least one resource associated with the configured grant. In an aspect, the communicating component 242, e.g., in conjunction with processor(s) 212, memory 216, and/or transceiver 202, may be configured to receive, via PUCCH, the message and the adjustment information of the at least one resource associated with the configured grant. In one example, the data can be associated with a priority level. Thus, the base station 102, the processor(s) 212, the communicating component 242 or one of its subcomponents may define the means for receiving, via PUCCH, the message and the adjustment information of the at least one resource associated with the configured grant. For example, in an aspect, the base station 102 may further operate the transceiver 202, RF front end 288, and one or more antennas 265 to receive the adjustment information in the form of data bits as a wireless signal or waveform, as described.

In some aspects, receiving, via a physical uplink control channel (PUCCH), the message may include receiving adjustment information of the at least one resource associated with the configured grant, the adjustment information corresponding to a payload including a number of bits or scrambling code used for scrambling the PUCCH.

In some aspects, receiving, via a PUSCH, the message may include receiving adjustment information of the at least one resource associated with the configured grant, the adjustment information corresponding to a payload including a number of bits or scrambling code used for scrambling the PUCCH.

In some aspects, the adjustment of the at least one resource may correspond to at least one of a release of the at least one resource, a suspension of the at least one resource for a duration, or a skipping of the at least one resource for a certain duration.

Figure 7:
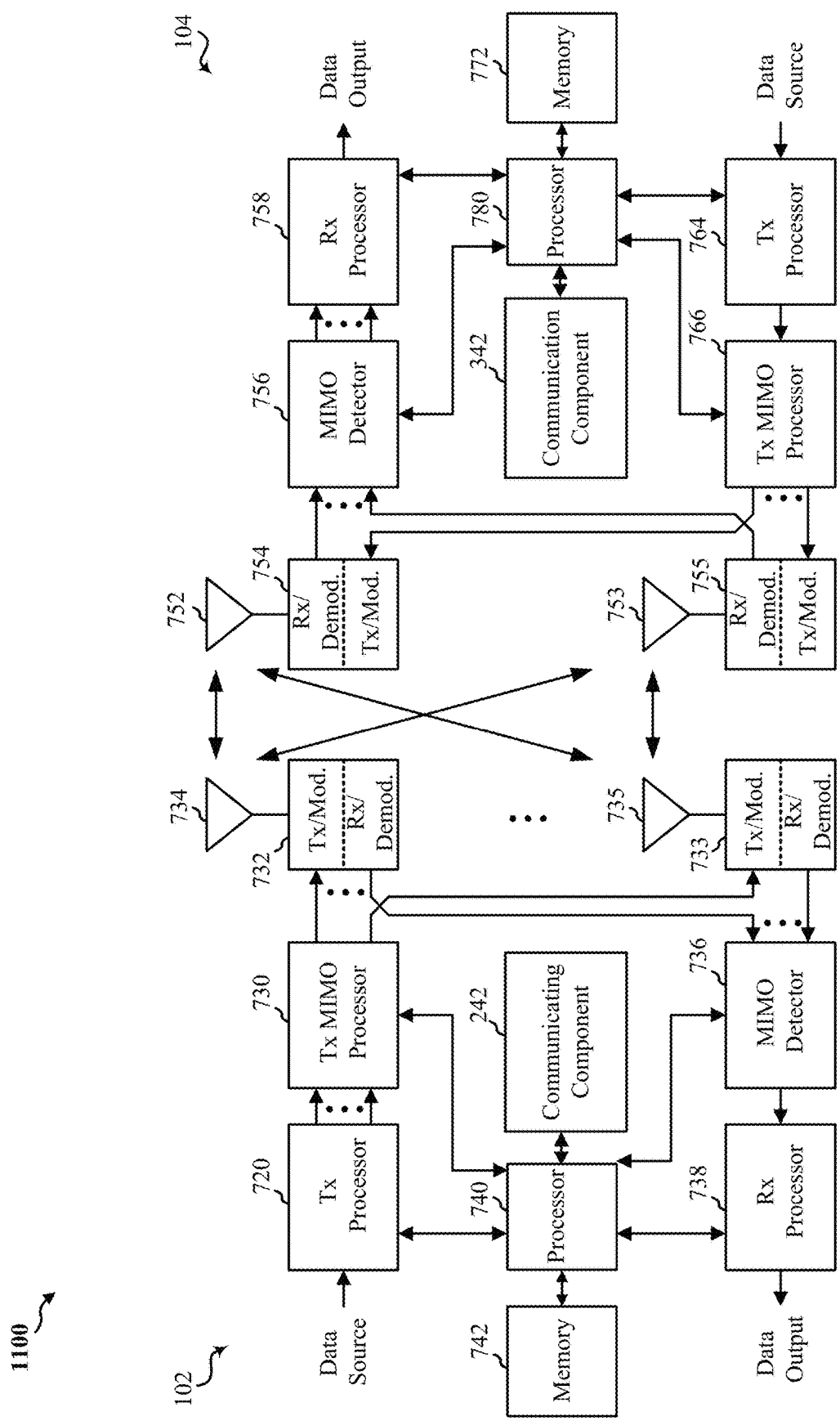
FIG. 7 is a block diagram illustrating an example of a MIMO communication system including a base station and a UE, in accordance with various aspects of the present disclosure.

FIG. 7 is a block diagram of a MIMO communication system 700 including a base station 102 and a UE 104. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1 and 2. At the UE 104, the UE antennas 752 and 753 may receive the DL signals from the base station 102 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 104 to a data output, and provide decoded control information to a processor 780, or memory 782.

The processor 780 may in some cases execute stored instructions to instantiate a communicating component 242 (see e.g., FIGS. 1 and 2).

On the uplink (UL), at the UE 104, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the base station 102 in accordance with the communication parameters received from the base station 102. At the base station 102, the UL signals from the UE 74 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The components of the UE 104 may, individually or collectively, be implemented with one or more ASICs adapted to perform some or all of the applicable functions in hardware. Each of the noted modules may be a means for performing one or more functions related to operation of the MIMO communication system 1000. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 700.

Some Additional Examples

The aspects described herein additionally include one or more of the following implementation examples described in the following numbered clauses.

1. A method of wireless communication at a user equipment (UE), comprising:
determining an upcoming absence of uplink data for transmission on an uplink communication channel to a network entity during a period defined by a configured grant; and
transmitting a message to the network entity to trigger adjustment of at least one resource associated with the configured grant based on determining the absence of uplink data for transmission on the uplink communication channel.

2. The method of clause 1, wherein the message is transmitted using a media access control (MAC) control element (CE).

3. The method of any preceding clause, wherein the message is transmitted using a buffer status report (BSR) MAC CE.

4. The method of any preceding clause, wherein the message further includes adjustment information of the at least one resource associated with the configured grant.

5. The method of any preceding clause, wherein transmitting the message includes transmitting final uplink data and the adjustment information using the MAC CE.

6. The method of any preceding clause, wherein the MAC CE is transmitted on a last resource of a physical uplink shared channel (PUSCH) transmission along with final uplink data.

7. The method of any preceding clause, further comprising determining that the final uplink data and the buffer status report satisfies a payload size threshold value representing a maximum size of a physical uplink shared channel (PUSCH) transmission corresponding to the defined period allocated by the configured grant; and
transmitting the adjustment information of the at least one resource associated with the configured grant to the network entity, wherein the indication corresponds to the flag indicating the upcoming transmission of adjustment information is transmitted based on determining that final uplink data and the buffer status report satisfies a payload size threshold value.

8. The method of any preceding clause, wherein the adjustment information is transmitted on a physical uplink control channel (PUCCH) prior to a subsequent scheduled physical uplink shared channel (PUSCH) transmission associated with the configured grant.

9. The method of any preceding clause, wherein the message in the PUSCH corresponds to a Layer 1 indication pointing to the adjustment information transmission on a physical uplink control channel (PUCCH) or physical uplink shared channel (PUSCH).

10. The method of any preceding clause, wherein the message further includes an indication corresponding to a flag indicating an upcoming transmission of adjustment information.

11. The method of any preceding clause, wherein the indication further includes information about the resource carrying the adjustment information including an offset from a resource carrying the flag.

12. The method of any preceding clause, wherein the adjustment information is transmitted on a subsequent scheduled physical uplink shared channel (PUSCH) transmission associated with the configured grant after a Layer 1 indication is transmitted on a current PUSCH, the Layer 1 indication corresponding to a distinct indication represented by a number of bits or a scrambling code used to scramble the current PUSCH.

13. The method of any preceding clause, wherein transmitting the message includes transmitting final uplink data and the Layer 1 indication using a physical uplink shared channel (PUSCH) transmission of the configured grant, the Layer 1 indication corresponding to a payload including a number of bits or a scrambling code used to scramble the said PUSCH.

14. The method of any preceding clause, further comprising transmitting, via a subsequent PUSCH, the adjustment information of the at least one resource associated with the configured grant.

15. The method of any preceding clause, further comprising transmitting, via PUCCH, the adjustment information of the at least one resource associated with the configured grant.

16. The method of any preceding clause, wherein transmitting, via a physical uplink control channel (PUCCH), the message includes transmitting adjustment information of the at least one resource associated with the configured grant, the adjustment information corresponding to a payload including a number of bits or scrambling code used for scrambling the PUCCH.

17. The method of any preceding clause, wherein transmitting, via a physical uplink shared channel (PUSCH), the message includes transmitting adjustment information of the at least one resource associated with the configured grant, the adjustment information corresponding to a payload including a number of bits or scrambling code used for scrambling the PUSCH.

18. The method of any preceding clause, wherein the adjustment of the at least one resource corresponds to at least one of:
a release of the at least one resource,
a suspension of the at least one resource for a duration, or
a skipping of the at least one resource for a certain duration.

19. An apparatus for wireless communication, comprising:
a memory; and
at least one processor in communication with the memory, wherein the at least one processor is configured to:
determine an upcoming absence of uplink data for transmission on an uplink communication channel to a network entity during a period defined by a configured grant; and
transmit a message to the network entity to trigger adjustment of at least one resource associated with the configured grant based on determining the absence of uplink data for transmission on the uplink communication channel.

20. The apparatus of clause 19, wherein the message is transmitted using a media access control (MAC) control element (CE).

21. The apparatus of any preceding clause, wherein the message is transmitted using a buffer status report (BSR) MAC CE.

22. The apparatus of any preceding clause, wherein the message further includes adjustment information of the at least one resource associated with the configured grant.

23. The apparatus of any preceding clause, wherein the message is transmitted final uplink data and the adjustment information using the MAC CE.

24. The apparatus of any preceding clause, wherein the MAC CE is transmitted on a last resource of a physical uplink shared channel (PUSCH) transmission along with final uplink data.

25. The apparatus of any preceding clause, wherein the at least one processor is further configured to:
determine that the final uplink data and the buffer status report satisfies a payload size threshold value representing a maximum size of a physical uplink shared channel (PUSCH) transmission corresponding to the defined period allocated by the configured grant; and
transmit the adjustment information of the at least one resource associated with the configured grant to the network entity,
wherein the adjustment information includes a flag indicating the upcoming transmission of adjustment information is transmitted based on determining that final uplink data and the buffer status report satisfies a payload size threshold value.

26. The apparatus of any preceding clause, wherein the adjustment information is transmitted on a physical uplink control channel (PUCCH) prior to a subsequent scheduled physical uplink shared channel (PUSCH) transmission associated with the configured grant.

27. The apparatus of any preceding clause, wherein to transmit, via a physical uplink control channel (PUCCH), the message, the at least one processor is further configured to transmit adjustment information of the at least one resource associated with the configured grant, the adjustment information corresponding to a payload including a number of bits or scrambling code used for scrambling the PUCCH.

28. The apparatus of any preceding clause, wherein to transmit, via a physical uplink shared channel (PUSCH), the message, the at least one processor is further configured to transmit adjustment information of the at least one resource associated with the configured grant, the adjustment information corresponding to a payload including a number of bits or scrambling code used for scrambling the PUSCH.

29. A computer-readable medium storing computer code executable by a processor for wireless communications comprising code for:
determining an upcoming absence of uplink data for transmission on an uplink communication channel to a network entity during a period defined by a configured grant; and
transmitting a message to the network entity to trigger adjustment of at least one resource associated with the configured grant based on determining the absence of uplink data for transmission on the uplink communication channel.

30. An apparatus for wireless communication, comprising:
means for determining an upcoming absence of uplink data for transmission on an uplink communication channel to a network entity during a period defined by a configured grant; and
means for transmitting a message to the network entity to trigger adjustment of at least one resource associated with the configured grant based on determining the absence of uplink data for transmission on the uplink communication channel.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims.

For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communication at a user equipment (UE), comprising:

identifying an upcoming absence of uplink data for transmission on an uplink communication channel to a network entity during a period defined by a configured grant; and transmitting a message including adjustment information of at least one resource associated with the configured grant to the network entity, the message triggering adjustment of the at least one resource associated with the configured grant based on identifying the absence of uplink data for transmission on the uplink communication channel, wherein the message including the adjustment information is transmitted on a subsequent scheduled physical uplink shared channel (PUSCH) transmission associated with the configured grant after a Layer 1 indication is transmitted on a current PUSCH, the Layer 1 indication corresponding to a distinct indication represented by a number of bits or a scrambling code used to scramble the current PUSCH.

2. The method of claim 1, wherein the message is transmitted using a media access control (MAC) control element (CE).

3. The method of claim 2, wherein the message is transmitted using a buffer status report (BSR) MAC CE.

4. The method of claim 3, wherein the MAC CE is transmitted on a last resource of a physical uplink shared channel (PUSCH) transmission along with final uplink data.

5. The method of claim 4, further comprising determining that the final uplink data and the buffer status report satisfies a payload size threshold value representing a maximum size of a physical uplink shared channel (PUSCH) transmission corresponding to the defined period allocated by the configured grant; and transmitting the adjustment information of the at least one resource associated with the configured grant to the network entity, wherein the adjustment information includes a flag indicating the upcoming transmission of adjustment information is transmitted based on determining that final uplink data and the buffer status report satisfies a payload size threshold value.

6. The method of claim 1, wherein transmitting the message includes transmitting final uplink data and the adjustment information using the MAC CE.

7. The method of claim 1, wherein the adjustment information is transmitted on a physical uplink control channel (PUCCH) prior to a subsequent scheduled physical uplink shared channel (PUSCH) transmission associated with the configured grant.

8. The method of claim 1, wherein the message in the PUSCH corresponds to a Layer 1 indication pointing to the adjustment information on a physical uplink control channel (PUCCH) or physical uplink shared channel (PUSCH).

9. The method of claim 1, wherein the message further includes an indication corresponding to a flag indicating an upcoming transmission of the adjustment information.

10. The method of claim 9, wherein the indication further includes information about the resource carrying the adjustment information including an offset from a resource carrying the flag.

11. The method of claim 1, wherein transmitting the message includes transmitting final uplink data and the Layer 1 indication using a physical uplink shared channel (PUSCH) transmission of the configured grant, the Layer 1 indication corresponding to a payload including a number of bits or a scrambling code used to scramble the said PUSCH.

12. The method of claim 11, further comprising transmitting, via a subsequent PUSCH, the adjustment information of the at least one resource associated with the configured grant.

13. The method of claim 11, further comprising transmitting, via PUCCH, the adjustment information of the at least one resource associated with the configured grant.

14. The method of claim 1, wherein transmitting, via a physical uplink control channel (PUCCH), the message includes transmitting adjustment information of the at least one resource associated with the configured grant, the adjustment information corresponding to a payload including a number of bits or scrambling code used for scrambling the PUCCH.

15. The method of claim 1, wherein transmitting, via a physical uplink shared channel (PUSCH), the message includes transmitting adjustment information of the at least one resource associated with the configured grant, the adjustment information corresponding to a payload including a number of bits or scrambling code used for scrambling the PUSCH.

16. The method of claim 1, wherein the adjustment of the at least one resource corresponds to at least one of:
a release of the at least one resource,
a suspension of the at least one resource for a duration, or
a skipping of the at least one resource for a certain duration.

17. An apparatus for wireless communication, comprising:
a memory; and
at least one processor in communication with the memory, wherein the at least one processor is configured to:
identify an upcoming absence of uplink data for transmission on an uplink communication channel to a network entity during a period defined by a configured grant; and
transmit a message including adjustment information of at least one resource associated with the configured grant to the network entity, the message triggering adjustment of the at least one resource associated with the configured grant based on identifying the absence of uplink data for transmission on the uplink communication channel, wherein the message including the adjustment information is transmitted on a subsequent scheduled physical uplink shared channel (PUSCH) transmission associated with the configured grant after a Layer 1 indication is transmitted on a current PUSCH, the Layer 1 indication corresponding to a distinct indication represented by a number of bits or a scrambling code used to scramble the current PUSCH.

18. The apparatus of claim 17, wherein the message is transmitted using a media access control (MAC) control element (CE).

19. The apparatus of claim 18, wherein the message is transmitted using a buffer status report (BSR) MAC CE.

20. The apparatus of claim 19, wherein the MAC CE is transmitted on a last resource of a physical uplink shared channel (PUSCH) transmission along with final uplink data.

21. The apparatus of claim 20, wherein the at least one processor is further configured to:
determine that the final uplink data and the buffer status report satisfies a payload size threshold value representing a maximum size of a physical uplink shared channel (PUSCH) transmission corresponding to the defined period allocated by the configured grant; and
transmit the adjustment information of the at least one resource associated with the configured grant to the network entity,
wherein the adjustment information includes a flag indicating the upcoming transmission of adjustment information is transmitted based on determining that final uplink data and the buffer status report satisfies a payload size threshold value.

22. The apparatus of claim 17, wherein the message is transmitted final uplink data and the adjustment information using the MAC CE.

23. The apparatus of claim 17, wherein the adjustment information is transmitted on a physical uplink control channel (PUCCH) prior to a subsequent scheduled physical uplink shared channel (PUSCH) transmission associated with the configured grant.

24. The apparatus of claim 17, wherein to transmit, via a physical uplink control channel (PUCCH), the message, the at least one processor is further configured to transmit adjustment information of the at least one resource associated with the configured grant, the adjustment information corresponding to a payload including a number of bits or scrambling code used for scrambling the PUCCH.

25. The apparatus of claim 17, wherein to transmit, via a physical uplink shared channel (PUSCH), the message, the at least one processor is further configured to transmit adjustment information of the at least one resource associated with the configured grant, the adjustment information corresponding to a payload including a number of bits or scrambling code used for scrambling the PUSCH.

26. A non-transitory computer-readable medium storing computer code executable by a processor for wireless communications comprising code for:
identifying an upcoming absence of uplink data for transmission on an uplink communication channel to a network entity during a period defined by a configured grant; and
transmitting a message including adjustment information of at least one resource associated with the configured grant to the network entity, the message triggering adjustment of the at least one resource associated with the configured grant based on identifying the absence of uplink data for transmission on the uplink communication channel, wherein the message including the adjustment information is transmitted on a subsequent scheduled physical uplink shared channel (PUSCH) transmission associated with the configured grant after a Layer 1 indication is transmitted on a current PUSCH, the Layer 1 indication corresponding to a distinct indication represented by a number of bits or a scrambling code used to scramble the current PUSCH.

27. An apparatus for wireless communication, comprising:
means for identifying an upcoming absence of uplink data for transmission on an uplink communication channel to a network entity during a period defined by a configured grant; and
means for transmitting a message including adjustment information of at least one resource associated with the configured grant to the network entity, the message triggering adjustment of the at least one resource associated with the configured grant based on identifying the absence of uplink data for transmission on the uplink communication channel, wherein the message including the adjustment information is transmitted on a subsequent scheduled physical uplink shared channel (PUSCH) transmission associated with the configured grant after a Layer 1 indication is transmitted on a current PUSCH, the Layer 1 indication corresponding to a distinct indication represented by a number of bits or a scrambling code used to scramble the current PUSCH.

* * * * *